United States Patent
Cook

(10) Patent No.: US 12,453,306 B2
(45) Date of Patent: Oct. 28, 2025

(54) FLEXIBLE CUTTERBAR WITH ADJUSTABLE CUT HEIGHT

(71) Applicant: CNH Industrial America LLC, New Holland, PA (US)

(72) Inventor: Joel Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 781 days.

(21) Appl. No.: 17/743,828

(22) Filed: May 13, 2022

(65) Prior Publication Data

US 2023/0363306 A1    Nov. 16, 2023

(51) Int. Cl.
*A01D 34/24* (2006.01)
*A01D 41/14* (2006.01)

(52) U.S. Cl.
CPC ........... *A01D 34/243* (2013.01); *A01D 41/14* (2013.01)

(58) Field of Classification Search
CPC .... A01D 34/243; A01D 14/41; A01D 41/145; B62D 25/20; B62D 25/2072
USPC ........... 56/DIG. 10, 15.8, DIG. 3, 14.5, 17.2
See application file for complete search history.

(56) References Cited

U.S. PATENT DOCUMENTS

| | | | |
|---|---|---|---|
| 1,881,411 A * | 10/1932 | Love | A01D 45/24 56/181 |
| 2,102,710 A | 12/1937 | Hume et al. | |
| 2,652,672 A * | 9/1953 | Love | A01B 63/023 172/390 |
| 2,750,727 A * | 6/1956 | Wright | A01D 41/141 116/DIG. 13 |
| 3,672,696 A | 6/1972 | Akgulian et al. | |
| 4,835,954 A | 6/1989 | Enzmann | |
| 7,730,700 B2 * | 6/2010 | Nathan | A01D 41/141 56/10.2 E |
| 8,745,963 B1 | 6/2014 | Shoup | |
| 8,839,901 B1 * | 9/2014 | Bradshaw | B62D 25/2072 180/346 |
| 9,095,093 B2 | 8/2015 | Hyronimus et al. | |
| 9,538,709 B2 * | 1/2017 | Bassett | A01D 89/002 |
| 9,861,036 B2 | 1/2018 | Totten et al. | |

(Continued)

FOREIGN PATENT DOCUMENTS

| | | |
|---|---|---|
| EP | 1716738 A1 | 11/2006 |
| EP | 2984921 A1 | 2/2016 |

(Continued)

OTHER PUBLICATIONS

International Search Report and Written Opinion for PCT Application No. PCT/US2023/022001 dated Aug. 18, 2023 (9 pages).

*Primary Examiner* — Joseph M Rocca
*Assistant Examiner* — Sunny D Webb
(74) *Attorney, Agent, or Firm* — Buchanan Ingersoll & Rooney PC

(57) ABSTRACT

An adjustable skid shoe enabling a flexible cutter bar of an agricultural combine harvester to follow the ground at a higher cut height during the flex cutter bar mode. The adjustable skid shoe is hinged and can be fixed so the curved aft end lowers the ground contact surface beneath the header, raising the cut height in flex mode. The adjusted skid shoe contacts the ground further back from the cutter bar, allowing the cutter bar to reach close to the ground by a front pivot of the header on the adjusted skid shoe. Also, an agricultural vehicle header and an agricultural combine harvester comprising the skid shoe.

20 Claims, 6 Drawing Sheets

(56) References Cited

U.S. PATENT DOCUMENTS

| | | | | |
|---|---|---|---|---|
| 10,299,434 B2* | 5/2019 | Yanke | .................... | A01D 43/06 |
| 10,477,764 B2* | 11/2019 | Lacy | .................... | A01D 41/145 |
| 11,006,571 B2* | 5/2021 | Fay, II | ................. | A01D 34/283 |
| 2016/0183461 A1* | 6/2016 | Neudorf | ............... | A01D 41/145 |
| | | | | 56/158 |
| 2019/0029176 A1 | 1/2019 | Yanke et al. | | |

FOREIGN PATENT DOCUMENTS

| | | | | |
|---|---|---|---|---|
| EP | 3440919 A1 | | 2/2019 | |
| GB | 773920 A | * | 5/1957 | ........... A01D 61/008 |

* cited by examiner

FLEXIBLE CUTTERBAR WITH ADJUSTABLE CUT HEIGHT

FIELD OF THE INVENTION

The present invention is related to agricultural combine harvesters, in particular to a header for a combine harvester having a flexible cutter bar, more particularly to a skid shoe that can be adjusted to raise the cutting height of a flexible cutter bar operating in the flex mode.

BACKGROUND OF THE INVENTION

Agricultural combine harvesters are vehicles for harvesting and processing crops such as wheat or corn. A combine harvester typically includes a laterally-extending header that is movably attached to the front of the combine chassis. Crops are cut from the field by a cutter bar extending laterally across the front of the header. An auger or a belt (draper) system brings the cut material to a central area of the header, and from there an infeed mechanism transports the cut crops to the interior of the vehicle to a threshing mechanism and further to a cleaning section, where grains are separated from crop residue.

The header typically is located at the front of the vehicle and extends laterally relative to the vehicle's direction of travel. The header can be a single rigid body, or it can be a multi-segment or articulated header, comprising multiple sections that are movable relative to each other and to the vehicle chassis. Hydraulic or pneumatic cylinders, screws, springs, or other actuators, linkages, and the like may be provided to selectively control the positions of the header and its constituent parts. During operation, the header and/or cutter bar might be raised or lowered to account for variations in the ground level, properties of the particular crop being harvested, or various other operating conditions or requirements.

Thus, a typical header might be pivotally mounted to the vehicle chassis by way of a feeder housing that can be moved up and down to raise and lower the entire header. The header also may include a forward tilt adjustment mechanism that rotates the entire header forward and backward to change the angle of the header relative to the ground. Still further, the header might have a lateral tilt adjustment mechanism to rotate the header about the fore-aft axis to account for different ground levels in the lateral direction. A header having height and tilt adjust mechanisms may be operated by actively raising and lowering the header to account for undulations in the ground. Ground distance sensing equipment located below the header signals the header height position controller to raise and lower the entire mass of the header to avoid damaging contact with irregular ground or obstacles.

The cutter bar is disposed forward of the header frame on movable supports that allow the cutter bar to move relative to the header frame. Various cutter bar support systems are known in the art. For example, the cutter bar may be mounted on flex arms that are mounted on the header frame by a pivot connection. Still further, the cutter bar may comprise a flexible cutter bar that is supported by multiple independently-movable supports along its lateral extent, allowing the cutter bar to flex to conform more precisely to lateral undulations in the terrain. Skid shoes beneath the cutter bar contact the ground and provide minimum clearance for the cutter bar to avoid damage to and excessive wear of the cutting elements due to contact with the ground or with rocks or other obstructions.

For certain harvesting operations requiring cutting crops close to the ground, the flex arms are freely movable relative to the header frame, and the cutter bar flexes up and down on flex arms tracking the local shape of the ground below each flex arm (flex mode). For other operations, it is desirable or necessary to secure or lock the movable supports to fix the cutter bar in a stationary position with respect to the header main frame (rigid mode).

Most flexible cutter bars have a skid shoe that sets a single cut height as low as possible to the ground, at about one and a half inches, for cutting crops like soybeans. For such operations the cutterbar is operated in flex mode with the cutter bar conforming precisely to lateral undulations in the terrain. For other crops, like wheat, it has been customary to fix the cutter bar in the rigid mode at about twelve to sixteen inches above the ground, which ordinarily provides ample clearance from ground irregularities. But farming practice are changing, and it has become desirable more recently to cut wheat closer to five inches from the ground. When a cutter bar is locked the rigid mode at this lower height, variations in the ground contour across the lateral width of the header may exceed the clearance of the locked cutter bar, and the risk of damaging contact with the ground is greatly increased.

While the state of the art provides various alternatives to avoid header damage due to unintended ground contact, there remains a need to advance the state of the art.

This description of the background is provided to assist with an understanding of the following explanations of exemplary embodiments, and is not an admission that any or all of this background information is necessarily prior art.

SUMMARY OF THE INVENTION

In one exemplary aspect, there is provided a skid shoe for a header of an agricultural harvester. The skid shoe has a fore end having a forward and upwardly directed outer convex surface, an aft end having a rearward and upwardly directed outer convex surface, and a central region joining the fore and aft ends with a pivot joint. An adjustable link is joined at a first end to the fore end of the skid shoe by a pivot joint and at a second, opposite end to the aft end of the skid shoe by an adjustable joint. The fore end, aft end, and adjustable link form a three bar mechanism configured to adjust an elevation of the aft end with respect to the fore end.

In some exemplary aspects, the adjustable link comprises a plurality of spaced apertures at the second end joined to the aft end of the skid shoe.

In some exemplary aspects, the aft end of the skid shoe is joined by a fastener to one of the spaced apertures.

In some exemplary aspects, the fastener is a pin or bolt.

In some exemplary aspects, the aft end further comprises first and second lateral sides each having an upwardly directed outward convex surface.

In some exemplary aspects, the central region has a substantially constant lateral width between the fore end and the aft end.

In some exemplary aspects, the aft end ends at an upwardly directed terminus.

In some exemplary aspects, there is provided a cutter bar assembly for a header of an agricultural harvester. The cutter bar assembly includes a flexible cutter bar and a skid shoe joined to the cutter bar. In some exemplary aspects, the skid shoe is joined to a flex arm that supports the cutter bar. The skid shoe has a fore end having a forward and upwardly directed outer convex surface, an aft end having a rearward and upwardly directed outer convex surface, and a central region joining the fore and aft ends with a pivot joint. An adjustable link is joined at a first end to the fore end of the skid shoe by a pivot joint and at a second, opposite end to the aft end of the skid shoe by an adjustable joint. The fore end, aft end, and adjustable link form a three bar mechanism configured to adjust an elevation of the aft end with respect to the fore end.

In some exemplary aspects, there is provided a header for an agricultural harvester, including a header frame and a cutter bar assembly joined to the header frame. The cutter bar assembly includes a flexible cutter bar and a skid shoe joined to the cutter bar. In some exemplary aspects, the header includes a plurality of laterally spaced flex arms joined to the header frame and supporting the cutter bar. In some exemplary aspects, the skid shoe is joined to a flex arm that supports the cutter bar. The skid shoe has a fore end having a forward and upwardly directed outer convex surface, an aft end having a rearward and upwardly directed outer convex surface, and a central region joining the fore and aft ends with a pivot joint. An adjustable link is joined at a first end to the fore end of the skid shoe by a pivot joint and at a second, opposite end to the aft end of the skid shoe by an adjustable joint. The fore end, aft end, and adjustable link form a three bar mechanism configured to adjust an elevation of the aft end with respect to the fore end.

In some exemplary aspects, there is provided an agricultural combine harvester, including a header with a header frame and a cutter bar assembly joined to the header frame. The cutter bar assembly includes a flexible cutter bar and a skid shoe joined to the cutter bar. The skid shoe has a fore end having a forward and upwardly directed outer convex surface, an aft end having a rearward and upwardly directed outer convex surface, a central region joining the fore and aft ends with a pivot joint, and an adjustable link joined at a first end to the fore end of the skid shoe by a pivot joint and at a second, opposite end to the aft end of the skid shoe by an adjustable joint. The fore end, aft end, and adjustable link form a three bar mechanism configured to adjust an elevation of the aft end with respect to the fore end.

In some exemplary aspects, the adjustable link includes a plurality of spaced apertures at the second end joined to the aft end of the skid shoe, and the aft end of the skid shoe is joined by a fastener to one of the spaced apertures.

In some exemplary aspects, the header includes a plurality of laterally spaced flex arms joined to the header frame and supporting the cutter bar, wherein the skid shoe is joined to a flex arm that supports the cutter bar.

BRIEF DESCRIPTION OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown. Embodiments of inventions will now be described, strictly by way of example, with reference to the accompanying drawings, in which.

DETAILED DESCRIPTION OF PREFERRED EMBODIMENTS OF THE INVENTION

Figure 1:
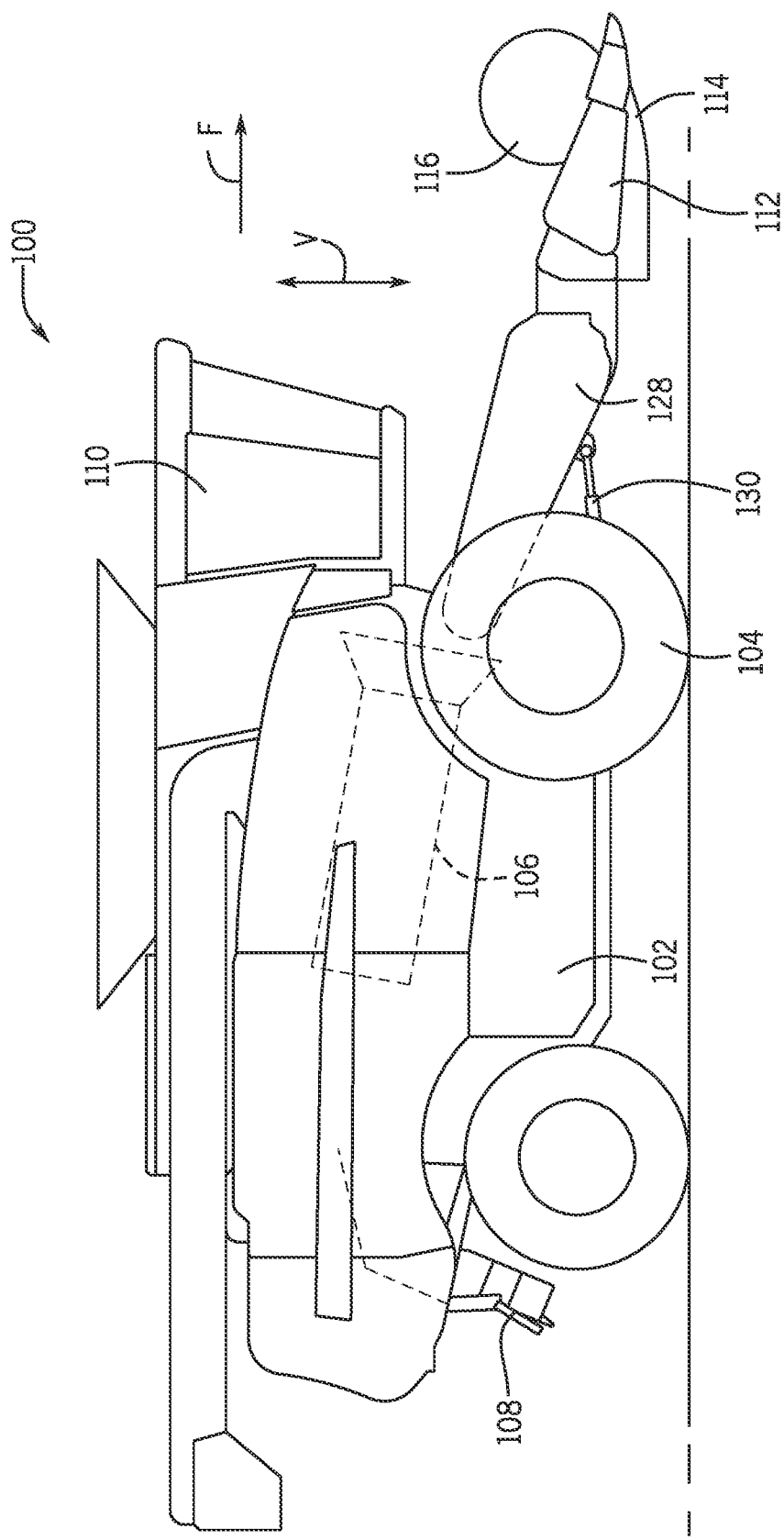
FIG. 1 is a side view of an agricultural combine harvester.

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown. Exemplary embodiments of the present invention provide cutter bar and draper support assemblies for headers for agricultural equipment, such as combines, swathers, windrowers, and the like. It will be appreciated that other embodiments may be used in other types of machines having a similar arrangement of parts, upon incorporation of the appropriate features of the inventions herein. The detailed description is not limiting the scope of the invention, which is defined only by the appended claims.

Preferred embodiments will now be described with reference to the drawings. The terms 'front' and 'back' or 'rear' are referenced to the front and back side of the agricultural combine harvester. The 'forward direction' of the agricultural combine harvester refers not to a single geometrical axis but to the general direction from the rear of the vehicle to the front.

FIG. 1 illustrates an example of an agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
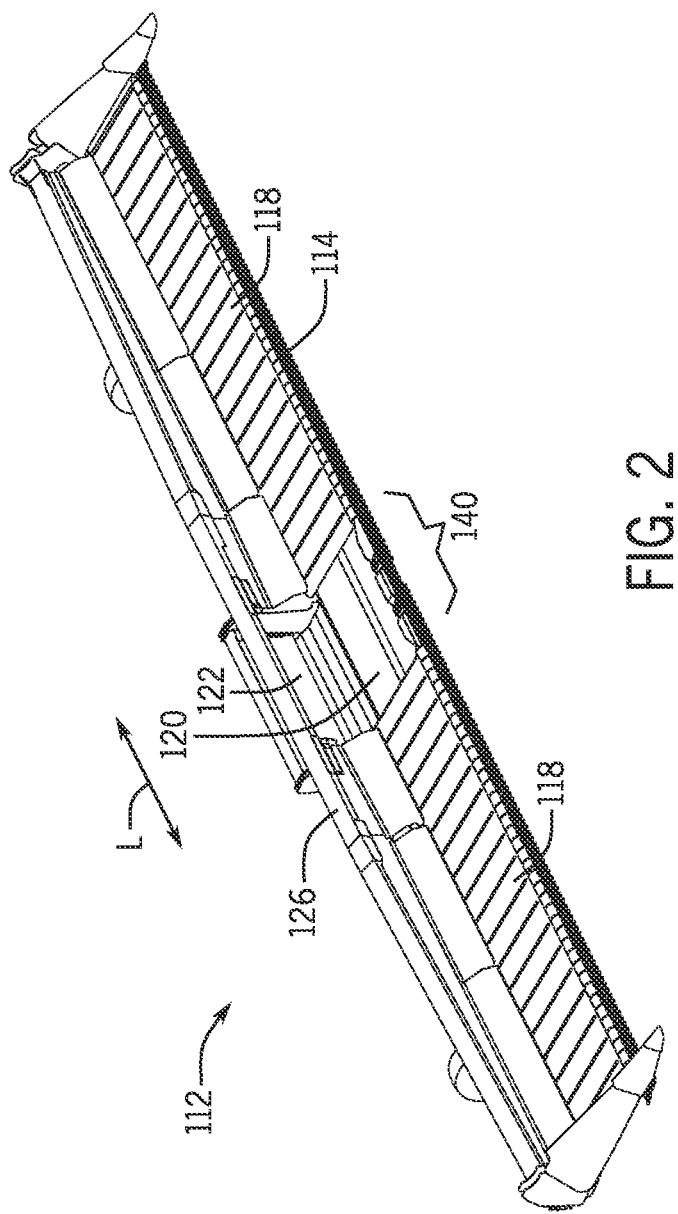
FIG. 2 is an isometric view of a header.
Figure 3:
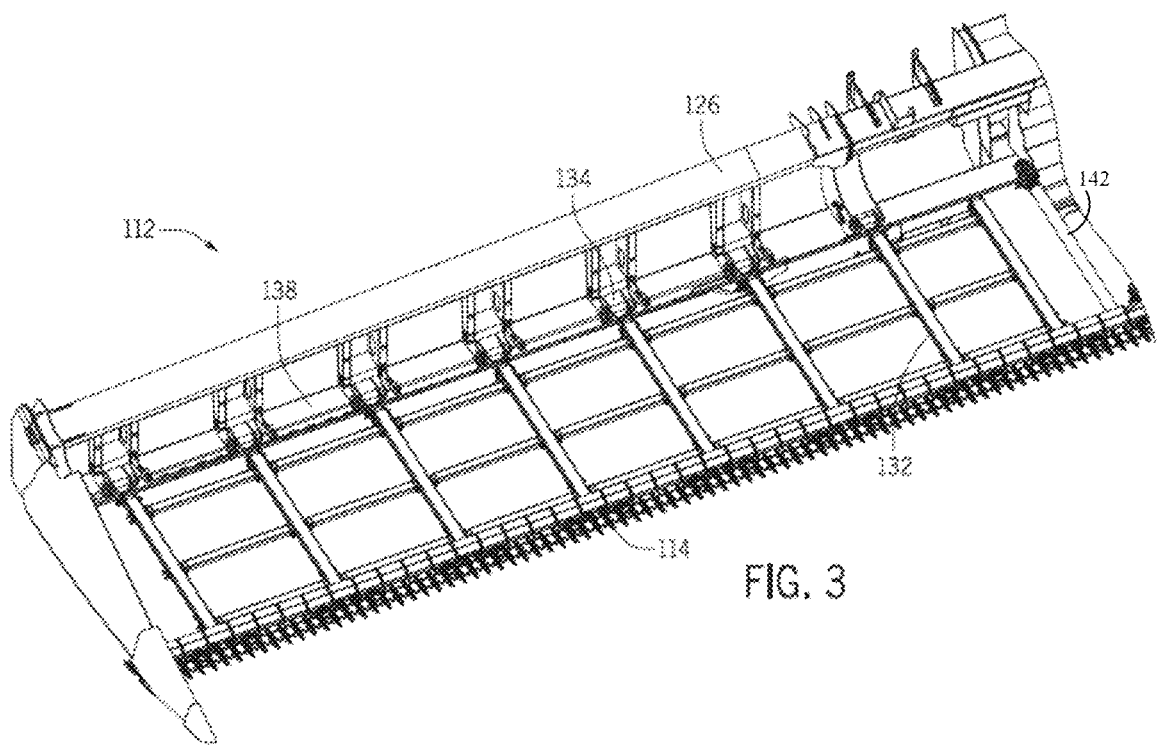
FIG. 3 is an isometric view of a portion of a header frame.

Referring also to FIGS. 2 and 3, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a infeed section 140 having a feeder conveyor 120 that conveys the crop material backwards towards a crop outlet 122.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more feeder housing actuators 130 to raise and lower the header 112 in a vertical direction V relative to the ground.

The illustrated exemplary header 112 is a unitary header having a single frame that extends continuously between the ends of the header 112 in the lateral direction L. In other embodiments, the header 112 may comprise a multi-segment or articulated header having a center section and one of more wing sections movably attached to the lateral end of the center section by pivots or linkages. In either case, the header 112 has an infeed section 140 forward of the crop outlet 122, and lateral regions extending in the lateral direction L from the infeed section 140.

The header 112 also includes a number of flex arms 132 that extend forward from the frame 126 to hold parts such as the cutter bar 114, conveyors 118, or the like. The flex arms 132 may be rigidly attached to the header 112, or attached by movable mounts, such as pivots or linkages. In the case of movable flex arms 132, a suspension may be used to control the motion of the flex arms 132. For example, each support 132 may have its own spring and/or damper system, which is intended to allow the flex arms 132 to move up and down individually or in groups to follow local undulations along the lateral direction L. At the center of the header, the infeed frame 142 acts as the flex arm for the cutter bar 114, and is similarly attached to the frame 126 and controlled as are the flex arms 132. Skids, gauge wheels or other ground supports (not shown) may be located below the flex arms 132 to generate a lifting force via contact with the ground. The positions of the ground supports and the spring and damping properties of the movable connections may be adjustable to tailor the header 112 for use in particular operating conditions. In addition, the positions of the flex arms 132 and infeed frame 142, such as their angular orientation (downward tilt) relative to the frame 126, may be adjustable.

In the example of FIG. 3, it can be seen that the flex arms 132 and the infeed frame 142 extend forward from a main truss 138 of the header frame 126. The main truss 138 is located at a lower end of the frame 126, and extends in the lateral direction L. Thus, the main truss 138 acts as the structural backbone of the frame in holding the flex arms 132 and infeed frame 142. Each flex arm 132 and the infeed frame 142 are pivotally connected to the header frame 126 at a respective pivot 134.

Figure 4:
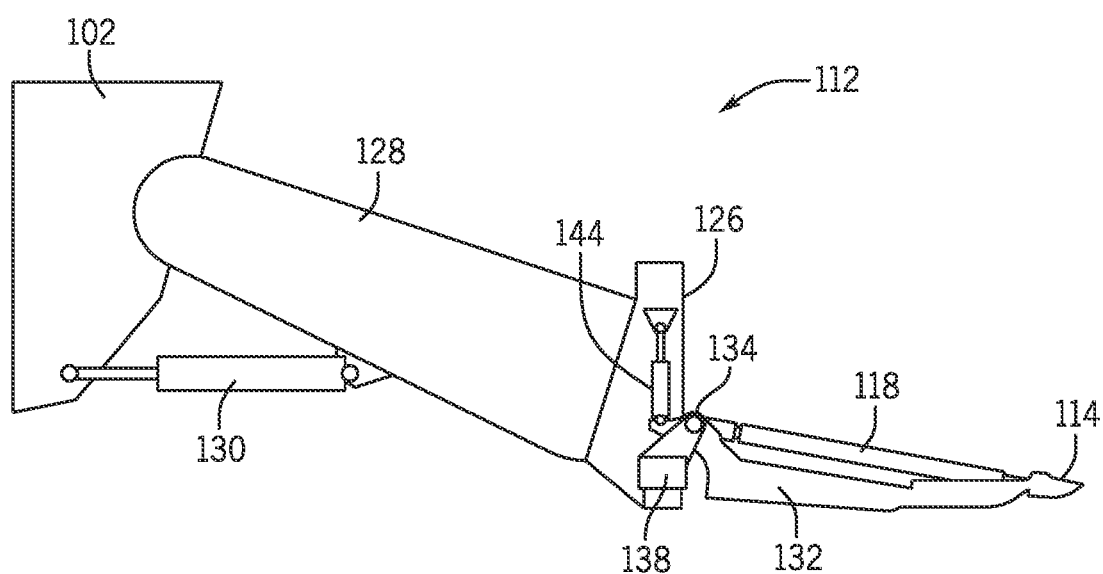
FIG. 4 is a side view of header attached to the chassis of an agricultural combine harvester.

FIG. 4 illustrates a flex arm 132 that is attached to the header frame 126 by a movable connection, such as a pivot 134. The flex arm 132 may include various components, such as a cutterbar 114 and draper belts 118. One or more hydraulic actuators 144 connect the flex arm 132 to the main frame 126 via main truss 138. The header main frame 126 also may be movable relative to the chassis 102, such as by being attached to the chassis 102 by a movable feeder housing 128, as known in the art. This movable joint also may be operated by actuators 130. A control system (not shown) may regulate force between the main frame 126 and the ground and/or between the flex arm 132 and the ground through actuators 130 and/or 144.

Figure 5:
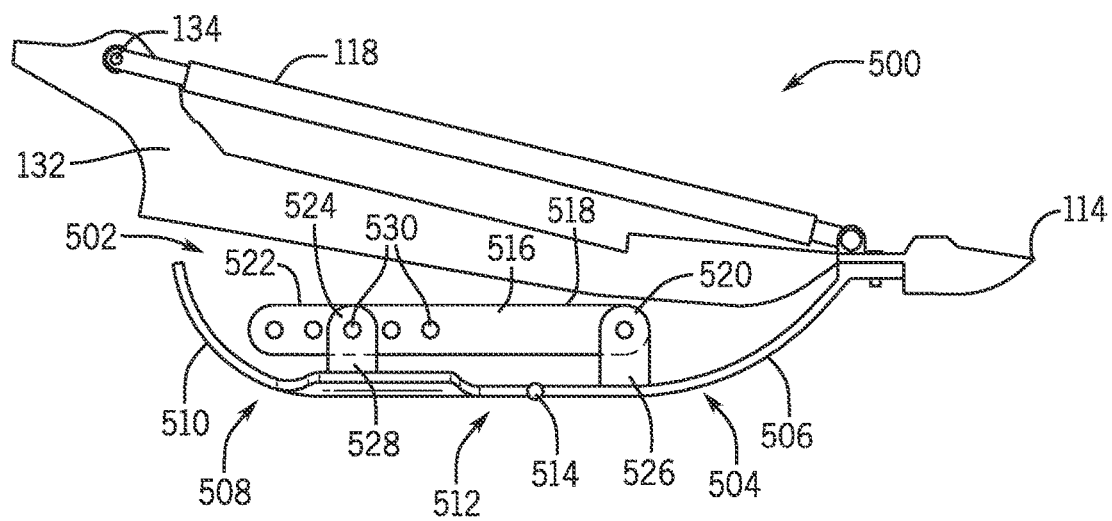
FIG. 5 is a side view of an exemplary embodiment of the cutter bar assembly and skid shoe in the normal operating position.

Referring now to FIG. 5, an example of a cutter bar assembly 500 for an agricultural harvester is shown. Cutter bar assembly 500 includes skid shoe 502 having a fore end 504 having a forward and upwardly directed outer convex surface 506, an aft end 508 having a rearward and upwardly directed outer convex surface 510, a central region 512 joining the fore and aft ends 504, 508 with a pivot joint 514 such as a hinge, and an adjustable link 516 joined at a first end 518 to the fore end 504 of the skid shoe 502 by a pivot joint 520 and at a second, opposite end 522 to the aft end 508 of the skid shoe 502 by an adjustable joint 524.

The fore end 504, aft end 508, and adjustable link 516 form a three bar mechanism configured to adjust an elevation of the aft end 508 with respect to the fore end 504. As shown in FIG. 5, adjustable link 516 includes a plurality of spaced apertures 530 at the second end to join link 516 to the aft end 508 of the skid shoe 502 in different positions at adjustable joint 524. Pivot joint 520 and adjustable joint 524 may be formed by lugs 526, 528 joined to link 516 by a fastener (not shown) such as a pin, bolt, and the like. In addition, a variable connection point along the second end 522 of link 516 may be provided by an alternative structure, such as a slot (not shown) in place of the spaced apertures 530, along with an appropriate fastener to fix the joint 524 in place on the link 516.

Figure 6:
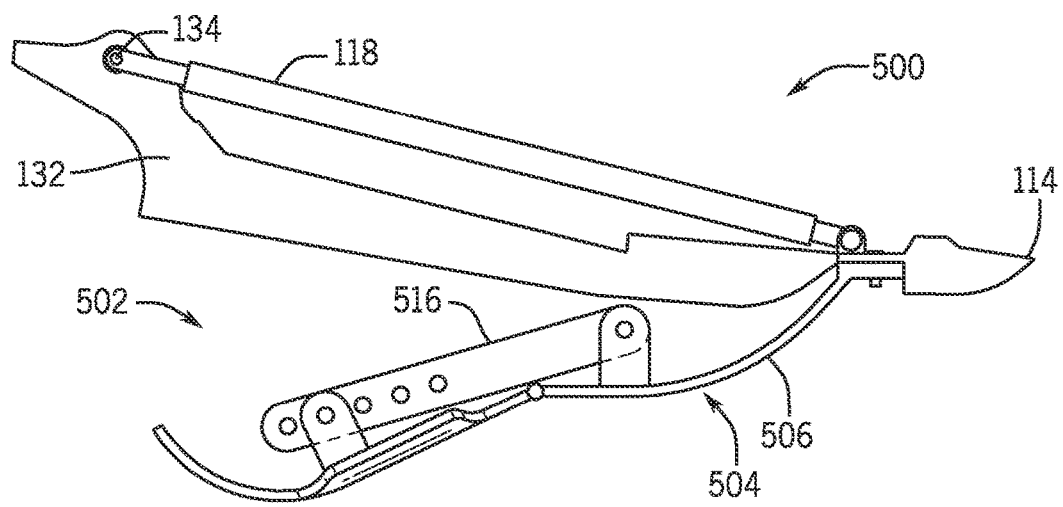
FIG. 6 is a side view of an exemplary embodiment of the cutter bar assembly and skid shoe in the lowered operating position.

As shown in FIG. 5, skid shoe 502 is in a normal operating position in which fore end 504 and aft end 508 are fixed such that the parts of central region 512 on either side of pivot 514 are 180 degrees apart. Referring now to FIG. 6, skid shoe 502 is shown in a raised position in which aft end 508 has been rotated downward about pivot 514 and surface 510 of aft end 508 is facing the ground. Skid shoe 502 is fixed in this position by adjustable link 516, which is now fixed to aft end 508 at joint 524 through an aperture 530 further distal from the first end of link 516 than the aperture 530 used to fix skid shoe 502 in the normal operating position.

In the raised position, surface 510 of aft end 508 of skid shoe 502 contacts the ground, allowing the flexible cutter bar 114 to follow the ground in flex mode at a higher cut height, eliminating the need to lock the cutter bar in a raised rigid mode and to provide a header height control system that uses electronic sensor input to avoid ground strikes in the rigid mode. In addition, because the contact point with surface 510 is further back from the cutter bar 114, cutter bar can be lowered closer to the ground by a forward tilt of feeder housing 128 and/or flex arms 132 pivoting on surface 510.

As shown in FIGS. 5 and 6, skid shoe 502 is bolted at its fore end 504 to cutter bar 114. In another aspect, fore end 504 of skid shoe 502 can be fixed to one or more flex arms 132 or to another structure of the header 112. Use of the adjustable skid shoe 502 spaced about thirty inches apart will prevent the cutter bar from drooping excessively. The adjustable skid shoe 502 could be fixed to each flex arm 132, to less than all the flex arms 132, or between the flex arms 132, at the same spacing as the flex arms 132 or at a different spacing. Adjustable skid shoes 502 could be used exclusively or in combination with any number of other skid shoe types.

Figure 7:
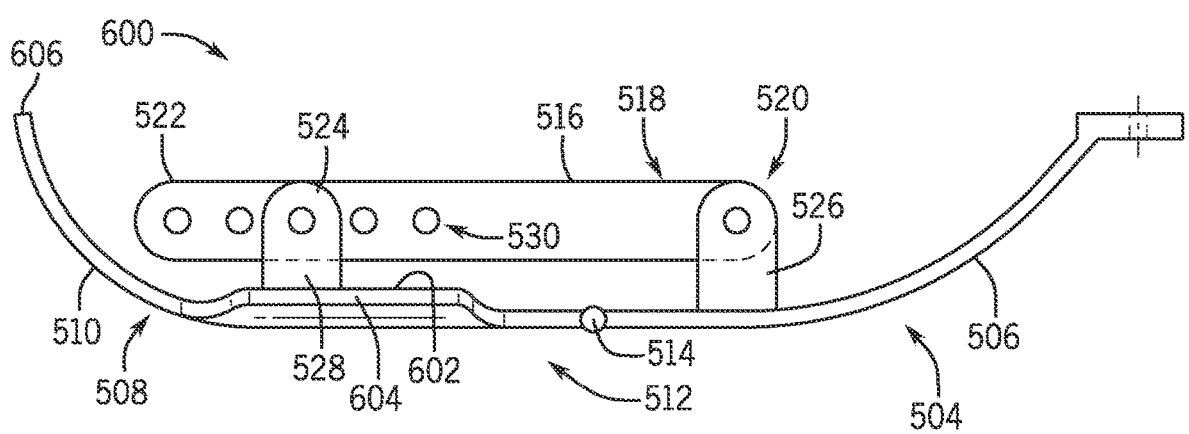
FIG. 7 is a side view of an exemplary embodiment of an adjustable skid shoe in the normal operating position.
Figure 8:
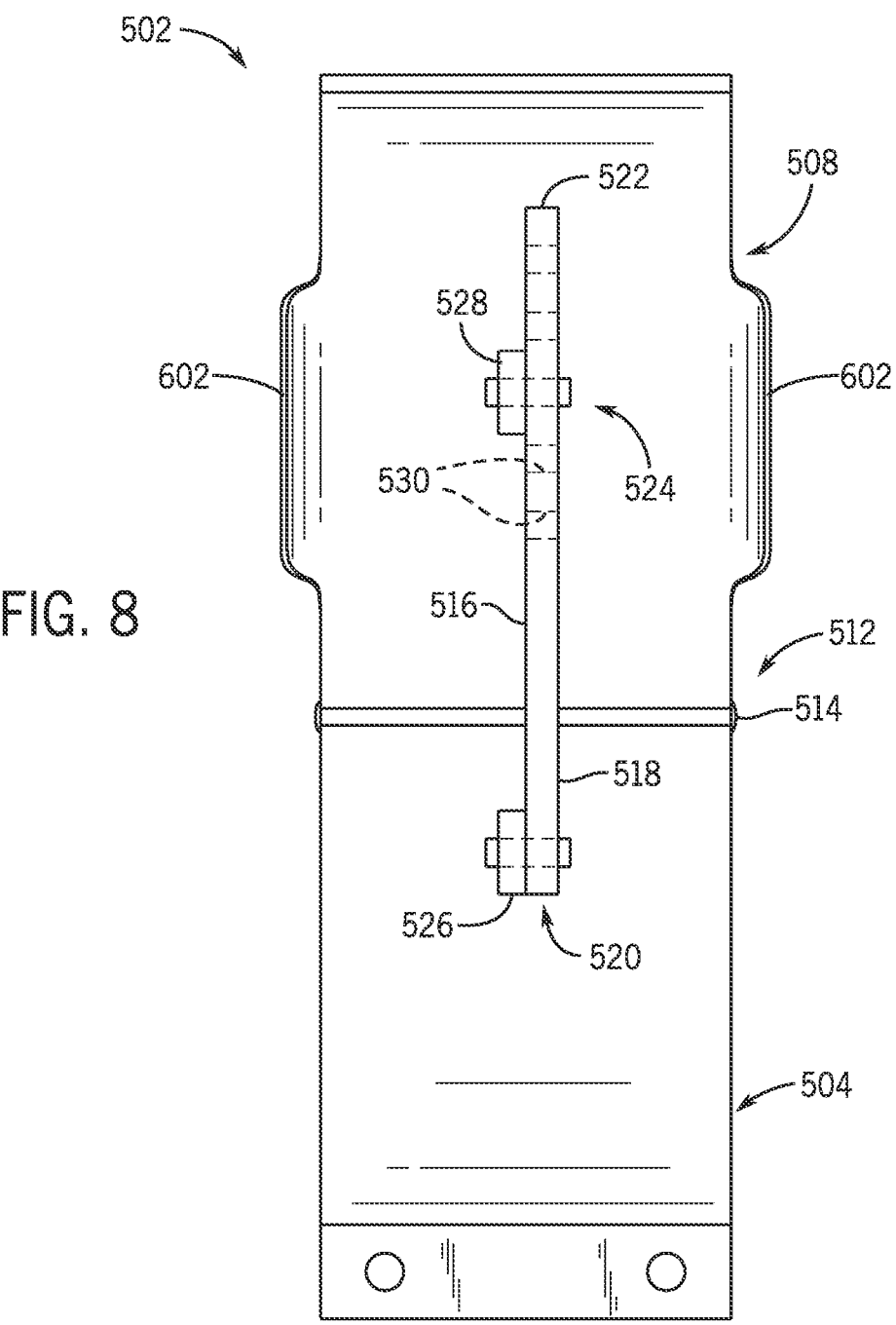
FIG. 8 is a top view of an exemplary embodiment of an adjustable skid shoe in the normal operating position.

Referring now to FIGS. 7 and 8, an example of a skid shoe 502 for a header 112 of an agricultural harvester is shown. Aft end 508 includes at least one lateral side 602 having an upwardly directed outward convex surface 604. The central region 512 has a substantially constant lateral width between the fore end 504 and the aft end 508. The aft end 508 ends at an upwardly directed terminus 606. The upwardly directed surfaces 604 and 510 are configured to resist penetration of the skid shoe 502 into the soil during back up or turning of the harvester.

Embodiments may be provided in various forms. In one instance, an embodiment may comprise an entire vehicle and header assembly, and the skid shoe may be integrated into the header or into the vehicle. In another instance, an embodiment may comprise a header and an associated control system. Other configurations may be used in other embodiments.

The present disclosure describes a number of inventive features and/or combinations of features that may be used alone or in combination with each other or in combination with other technologies. It will be appreciated that embodiments may include any combination of skid shoes and associated structures. For example, one or more conventional skid shoes also may also be used in combination with one or more embodiments such as those described above. Other alternatives and variations will be apparent to persons of ordinary skill in the art in view of the present disclosure.

The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

What is claimed:

1. A skid shoe for a header of an agricultural harvester, comprising:
   a fore end having a forward and upwardly directed outer convex surface;
   an aft end having a rearward and upwardly directed outer convex surface;
   a central region joining the fore and aft ends with a pivot joint; and
   an adjustable link joined at a first end to the fore end of the skid shoe by a pivot joint and at a second, opposite end to the aft end of the skid shoe by an adjustable joint,
   wherein the fore end, aft end, and adjustable link form a three bar mechanism configured to adjust an elevation of the aft end with respect to the fore end.

2. The skid shoe of claim 1, wherein the adjustable link comprises a plurality of spaced apertures at the second end joined to the aft end of the skid shoe.

3. The skid shoe of claim 2, wherein the aft end of the skid shoe is joined by a fastener to one of the spaced apertures.

4. The skid shoe of claim 3, wherein the fastener is a pin or bolt.

5. The skid shoe of claim 1, wherein the aft end further comprises at least one lateral side having an upwardly directed outward convex surface.

6. The skid shoe of claim 1, wherein the central region has a substantially constant lateral width between the fore end and the aft end.

7. The skid shoe of claim 1, wherein the aft end ends at an upwardly directed terminus.

8. A cutter bar assembly for a header of an agricultural harvester, comprising:
   a flexible cutter bar; and
   the skid shoe of claim 1 joined to the cutter bar.

9. The cutter bar assembly of claim 8, wherein the skid shoe is joined to a flex arm that supports the cutter bar.

10. A header for an agricultural harvester, comprising:
    a header frame; and
    the cutter bar assembly of claim 8 joined to the header frame.

11. The header of claim 10, comprising a plurality of laterally spaced flex arms joined to the header frame and supporting the cutter bar.

12. The header of claim 11, wherein the skid shoe is joined to a flex arm that supports the cutter bar.

13. An agricultural combine harvester, comprising the header of claim 10.

14. A header for an agricultural harvester, comprising:
    a header frame; and
    a cutter bar assembly joined to the header frame, wherein the cutter bar assembly comprises:
    a flexible cutter bar; and
    a skid shoe joined to the cutter bar, wherein the skid shoe comprises:
    a fore end having a forward and upwardly directed outer convex surface;
    an aft end having a rearward and upwardly directed outer convex surface;
    a central region joining the fore and aft ends with a pivot joint; and
    an adjustable link joined at a first end to the fore end of the skid shoe by a pivot joint and at a second, opposite end to the aft end of the skid shoe by an adjustable joint,
    wherein the fore end, aft end, and adjustable link form a three bar mechanism configured to adjust an elevation of the aft end with respect to the fore end.

15. The header of claim 14, wherein the adjustable link comprises a plurality of spaced apertures at the second end joined to the aft end of the skid shoe, and the aft end of the skid shoe is joined by a fastener to one of the spaced apertures.

16. The header of claim 14, comprising a plurality of laterally spaced flex arms joined to the header frame and supporting the cutter bar, wherein the skid shoe is joined to a flex arm that supports the cutter bar.

17. An agricultural combine harvester, comprising:
    a header, wherein the header comprises:
    a header frame; and
    a cutter bar assembly joined to the header frame, wherein the cutter bar assembly comprises:
    a flexible cutter bar; and
    a skid shoe joined to the cutter bar, wherein the skid shoe comprises:
    a fore end having a forward and upwardly directed outer convex surface;
    an aft end having a rearward and upwardly directed outer convex surface;
    a central region joining the fore and aft ends with a pivot joint; and
    an adjustable link joined at a first end to the fore end of the skid shoe by a pivot joint and at a second, opposite end to the aft end of the skid shoe by an adjustable joint,
    wherein the fore end, aft end, and adjustable link form a three bar mechanism configured to adjust an elevation of the aft end with respect to the fore end.

18. The agricultural combine harvester of claim 17, wherein the adjustable link comprises a plurality of spaced apertures at the second end joined to the aft end of the skid shoe, and the aft end of the skid shoe is joined by a fastener to one of the spaced apertures.

19. The agricultural combine harvester of claim 18, wherein the header comprises a plurality of laterally spaced flex arms joined to the header frame and supporting the cutter bar, wherein the skid shoe is joined to a flex arm that supports the cutter bar.

20. The skid shoe of claim 1, wherein the pivot joint pivotably joins the fore and aft ends.

* * * * *